No. 748,880. PATENTED JAN. 5, 1904.
F. PAWEL.
PERIPHERAL STRUCTURE FOR WHEELS.
APPLICATION FILED APR. 11, 1903.
NO MODEL. 2 SHEETS—SHEET 1.

Witnesses:
Arthur Juniper
William Schulz

Inventor:
Franz Pawel
by his attorney

No. 748,880. PATENTED JAN. 5, 1904.
F. PAWEL.
PERIPHERAL STRUCTURE FOR WHEELS.
APPLICATION FILED APR. 11, 1903.
NO MODEL. 2 SHEETS—SHEET 2.

Witnesses:
Arthur Junger
William Schulz

Inventor:
Franz Pawel
by his attorney

No. 748,880. Patented January 5, 1904.

UNITED STATES PATENT OFFICE.

FRANZ PAWEL, OF HANOVER, GERMANY.

PERIPHERAL STRUCTURE FOR WHEELS.

SPECIFICATION forming part of Letters Patent No. 748,880, dated January 5, 1904.

Application filed April 11, 1903. Serial No. 152,101. (No model.)

*To all whom it may concern:*

Be it known that I, FRANZ PAWEL, a subject of the Emperor of Germany, residing at Hanover, Germany, have invented certain new and useful Improvements in or Relating to Peripheral Structures for Wheels, of which the following is a specification.

The present invention relates to a peripheral structure for wheels, which consists principally of an endless spring-metal strip always held in uniform tension. The tire according to this invention differs from other similar tires mainly by the spring-metal strip taking up the vibration and by a resilient radially-adjustable tension device being arranged between said metal strip which forms directly or indirectly the outer portion of the tire and the wheel-rim.

In order that the description may be better understood, reference will be made to the accompanying drawings, wherein—

Figure 1:
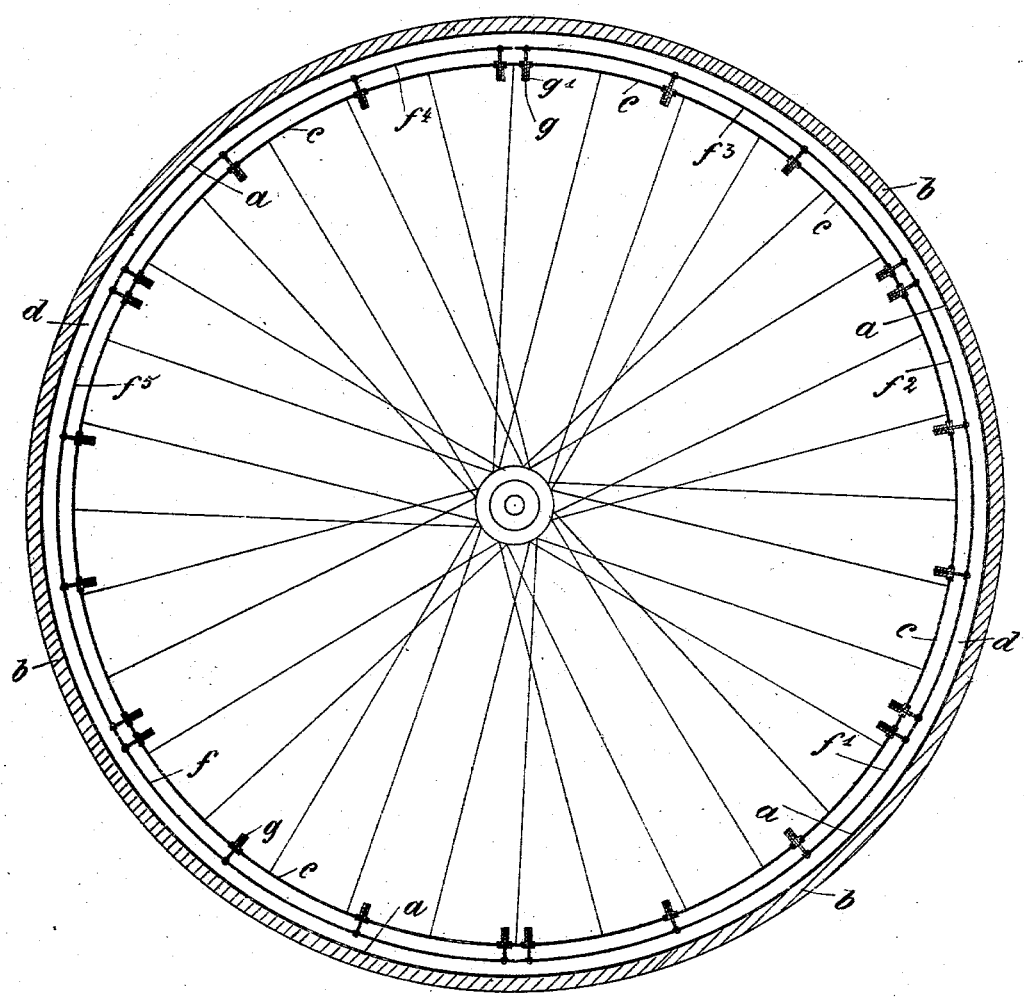
Figure 2:
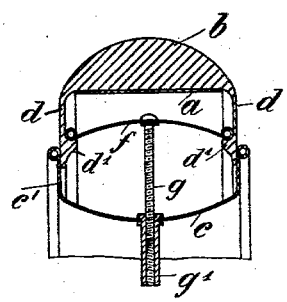
Figure 3:
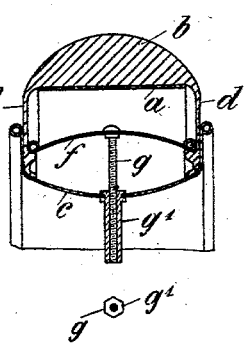
Figure 4:
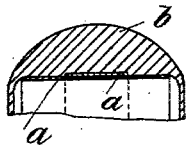
Figure 5:
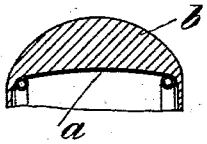
Figure 6:
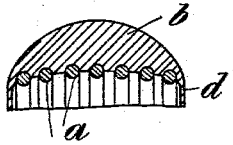
Figure 7:
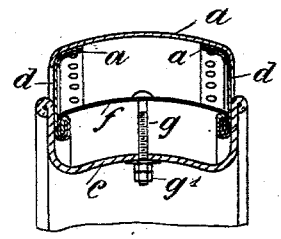

Figure 1 shows a wheel and tire according to this invention in longitudinal section on a reduced scale, Figs. 2 and 3 being cross-sections on an enlarged scale. Figs. 4, 5, and 6 show various modifications of the combination of a rubber outer cover with the endless spring-metal strip. Fig. 7 shows another construction of the invention.

Like letters indicate like parts throughout the drawings.

$a$ is an endless spring-metal strip or band, either provided with a rubber or other tread $b$, Figs. 1 to 6, or forming the tread itself. When an outer rubber cover is used, the endless metal band can be placed against the inner surface of the rubber cover, as shown in Figs. 2 and 3, and have a straight flat cross-section. Two or more of such bands may be used, as shown in Fig. 4, or the metal band could have a slightly-curved cross-sectional shape, as shown in Fig. 5. As shown in Fig. 6, the "spring-strip" may be constituted by endless wire spring-rings applied to the rubber cover $b$. The metal band or the wire rings can be partially or completely embedded in the rubber cover $b$.

$c$ is the rim of the wheel, having outwardly-turned flanges $c'$, and $d$ represents inwardly-turned flanges projecting from tread $b$ and telescoped by flanges $c'$. Each flange $d$ is provided with a shoulder $d'$, that constitutes the support for a series of intermediate resilient strips $f\ f'\ f^2\ f^3\ f^4\ f^5$, adapted to be drawn or tightened toward the center of the wheel, Fig. 1, such strips being independent of one another. In the construction shown in Figs. 2 and 3 the extension or flange $d\ d$ is constituted by the lateral portions of the rubber cover $b$, provided with enlarged edges $d'\ d'$, with which engage the edges of the strips $f\ f'\ f^2\ f^3\ f^4\ f^5$. Screws or bolts $g$, secured to the strips $f$, Figs. 2 and 3, pass through holes in the rim $c$ and are provided with nuts $g'$, whereby the strips $f\ f'\ f^2\ f^3\ f^4\ f^5$ may be drawn inward by tightening the nuts, while circumferential movement is prevented. The strips $f\ f'\ f^2\ f^3\ f^4\ f^5$ are bulged outwardly, being curved in cross-section in addition to their curvature in longitudinal section. Thus when the strips are drawn inwardly by the bolts $g$ they will expand laterally to increase in width and press the tread-flange $d$ against the rim-flange $c'$.

The endless spring-band $a$ or the outer cover $b$, connected to it, occupy before being tightened the position shown in Fig. 2. By turning the nuts $g'$ the strips $f\ f'\ f^2\ f^3\ f^4\ f^5$ are pulled radially inward toward the rim, whereby the metal band is uniformly stretched by the pull exercised on the lateral extensions $d$ and brought into the working position shown in Fig. 3. Between the band $a$ and strips $f$ a suitable space must be provided to enable the band $a$ to move inward.

Owing to the endless spring-band being uniformily connected along the whole of its circumference to the rim by means of the parts $d$, the tread or outer cover can be maintained exactly circular. At the point of contact with the ground the band will yield according to its elasticity, provided there is no obstacle in its way, as a free space is left between the strips $f$ and the band $a$ and owing to the arrangement of the connection $d$. This depression or displacement of the tread or cover at one place cannot, however, cause a corresponding yielding of the rest of the tire, owing to the connection $d$ opposing at all points the moving away of the band $a$ from the rim. In this way the tire remains perfectly circular at all other points and becomes momentarily deformed only at the point of contact with the ground to the extent corresponding to the elasticity and degree of tension of the metal band.

It is of secondary importance for the invention how the connection between the metal band $a$ and the rim $c$ is effected and by what means this connection is tightened radially. The number, shape, and size of the strips $f$ may be any desired.

The cross-sectional shape of the rim can vary, of course, according to the means used for tightening and the construction of the connection $d$.

Having now particularly described and ascertained the nature of my said invention and in what manner the same is to be performed, I declare that what I claim is—

1. A wheel provided with an endless band, a flanged tread inclosing the band, and a series of independent, bulged resilient strips engaging the tread-flange, substantially as specified.

2. A wheel provided with an endless band, a flanged tread surrounding the band, a flanged rim, and a series of independent, bulged, resilient strips adapted to press the tread-flange against the rim-flange, substantially as specified.

3. In a wheel, a tread provided with an inwardly-projecting flange having a shoulder, combined with a band inclosed by the tread, a rim having an outwardly-projecting flange that telescopes the tread-flange, a series of independent, bulged, resilient strips supported upon the tread-shoulder, and bolts engaging said strips, substantially as specified.

Signed by me at Hanover, Germany, this 28th day of March, 1903.

FRANZ PAWEL.

Witnesses:
LEONORE KASCH,
C. C. STEVENSON.